(12) United States Patent
Van Loon et al.

(10) Patent No.: US 10,926,517 B2
(45) Date of Patent: Feb. 23, 2021

(54) MULTILAYER FILMS AND METHODS OF MAKING THE SAME

(71) Applicant: ExxonMobil Chemical Patents Inc., Baytown, TX (US)

(72) Inventors: Achiel J. M. Van Loon, Antwerp (BE); Danny Van Hoyweghen, Heverlee (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 282 days.

(21) Appl. No.: 15/726,898

(22) Filed: Oct. 6, 2017

(65) Prior Publication Data

US 2018/0126707 A1   May 10, 2018

Related U.S. Application Data

(60) Provisional application No. 62/420,156, filed on Nov. 10, 2016.

(51) Int. Cl.
| | | |
|---|---|---|
| *B32B 27/08* | (2006.01) | |
| *B32B 27/32* | (2006.01) | |
| *B32B 37/15* | (2006.01) | |

(52) U.S. Cl.
CPC .............. *B32B 27/08* (2013.01); *B32B 27/32* (2013.01); *B32B 37/15* (2013.01); *B32B 2307/704* (2013.01); *B32B 2307/72* (2013.01); *B32B 2309/105* (2013.01); *B32B 2323/046* (2013.01)

(58) Field of Classification Search
None
See application file for complete search history.

(56) References Cited

U.S. PATENT DOCUMENTS

| | | | |
|---|---|---|---|
| 6,956,088 B2 | 10/2005 | Farley et al. | |
| 8,067,501 B2 * | 11/2011 | Fiscus | B32B 27/32 525/191 |
| 9,126,269 B2 | 9/2015 | Ohlsson et al. | |
| 2006/0281868 A1 * | 12/2006 | Sudhin | C08L 23/08 525/240 |
| 2012/0100356 A1 * | 4/2012 | Ohlsson | B32B 27/20 428/213 |
| 2013/0115398 A1 | 5/2013 | Lu et al. | |

FOREIGN PATENT DOCUMENTS

EP   0812854 A2 * 12/1997   ............. C07C 45/46

* cited by examiner

*Primary Examiner* — Frank J Vineis
*Assistant Examiner* — Nicole T Gugliotta

(57) ABSTRACT

Disclosed are multilayer films which can provide balanced improvement in film mechanical performance, where the film comprises a propylene-based polymer and an elastic ethylene copolymer.

17 Claims, No Drawings

MULTILAYER FILMS AND METHODS OF MAKING THE SAME

PRIORITY CLAIM

This application claims priority to and benefit of U.S. Ser. No. 62/420,156, filed Nov. 10, 2016, and is incorporated by reference in its entirety.

FIELD OF THE INVENTION

This invention relates to films and, in particular, to multilayer films comprising a propylene-based polymer and an ethylene copolymer, and methods for making such films.

BACKGROUND OF THE INVENTION

Coextruded blown films are widely used in a variety of packaging, as well as other applications. Polymers used in such films generally include polyethylene, polypropylene, ethylene vinyl alcohol, and the like. Film properties are often subject to the combined effect of the coextrusion process conditions and polymer compositions selected for the different layers. Film producers have to balance different mechanical properties repulsive to each other, such as stiffness-related and toughness-related properties, to make stronger films for a given thickness.

Recently, to address the limit of maximum achievable with three-layer films that appears to have been reached in many specific applications using the available selection of polymers, five-layer structure has been employed to facilitate selective improvement on desired properties and fine-tuning of property profile by splitting the functionality and extending potential of the conventional three-layer structure with the increased number of layers. However, it continues to be viewed as a difficulty by film manufacturers for packaging applications to develop a convenient and flexible approach to enable simultaneous improvement on both stiffness-related and toughness-related properties.

U.S. Pat. No. 9,126,269 discloses a multilayer blown film with improved strength or toughness comprising a layer comprising a metallocene polyethylene (mPE) having a high melt index ratio (MIR), a layer comprising an mPE having a low MIR, and a layer comprising a HDPE, and/or LDPE. Other embodiments have skin layers and a plurality of sub-layers. At least one sub-layer includes an mPE, and at least one additional sub-layer includes HDPE and/or LDPE.

U.S. 2013/115398 provides a polypropylene film, and a method of making the film, the film comprising at least one core layer sandwiched between at least two skin layers, the layers comprising a core layer comprising polypropylene and within the range of from 20 wt % to 50 wt %, by weight of the materials in the core layer, of a propylene-alpha-olefin elastomer having within the range of from 5 wt % to 25 wt % alpha-olefin derived units, by weight of the copolymer; and skin layers comprising one or more polymers having a melting point within the range of from 125° C. to 160° C., a Shore D Hardness within the range of from 55 to 70, and a Flexural Modulus of at least 600 MPa; wherein the film has a Haze value of less than 10%, the film being biaxially oriented but shrinkable substantially only in the MD.

U.S. Pat. No. 6,956,088 relates to films that exhibit an improved balance of physical properties, and a metallocene catalyzed polyethylene used to make the films that is easier to process than previous metallocene catalyst produced polyolefins and/or polyethylenes. The films are produced with polyethylenes having a relatively broad composition distribution (CD) and a relatively broad molecular weight distribution (MWD).

Thus, there remains an industry wide need for a film that can release the balance between stiffness-related and toughness-related properties from the longstanding restriction of having to increase one at the expense of compromising the other. Applicant has found that such an objective can be achieved by introducing a propylene-based polymer into the core or middle layer of a film and an elastic ethylene copolymer into sub-skin layers. Desirably, the inventive film can demonstrate stiffness and tear resistance both superior to those in absence of either the propylene-based polymer or the elastic ethylene copolymer, which indicates a well-balanced mechanical profile favored by most end-uses in the industry.

SUMMARY OF THE INVENTION

Provided are multilayer films comprising propylene-based polymer and ethylene copolymer and methods for making such films.

In one embodiment, the present invention encompasses a multilayer film comprising: (a) two outer layers; (b) a core layer between the two outer layers, the core layer comprising about 100 wt % of a propylene-based polymer, based on total weight of polymer in the core layer; and (c) two inner layers each between the core layer and each outer layer, wherein at least one of the inner layers comprises about 100 wt % of an ethylene copolymer, based on total weight of polymer in the inner layer. In another embodiment, the present invention relates to a method for making a multilayer film, comprising the steps of: (a) preparing two outer layers; (b) preparing a core layer between the two outer layers, the core layer comprising about 100 wt % of a propylene-based polymer, based on total weight of polymer in the core layer; (c) preparing two inner layers each between the core layer and each outer layer, wherein at least one of the inner layers comprises about 100 wt % of an ethylene copolymer, based on total weight of polymer in the inner layer; and (d) forming a film comprising the layers in steps (a) to (c).

The multilayer film described herein or made according to any method disclosed herein may have: (i) a 1% Secant Modulus of at least about 20%, 50%, or 100%, preferably 120%, preferably 140% higher in Machine Direction (MD) and of at least about 20%, 50%, or 100%, preferably 115%, preferably 130% higher in Transverse Direction (TD); and (ii) an Elmendorf tear of at least about 20%, preferably 55% higher in MD and of at least about 20%, preferably 45% higher in TD, compared to that of a film free of the propylene-based polymer in the core layer and the ethylene copolymer in the inner layer, but is otherwise identical in terms of film structure, layers' compositions, and the film's overall thickness.

Preferably, the propylene-based polymer is a polypropylene homopolymer. Preferably, the ethylene copolymer comprises one or more of the following: (a) a low crystalline polymer comprising greater than or equal to about 70 wt % units derived from ethylene, less than or equal to about 30 wt % units derived from propylene, and less than about 5 wt % of units derived from $C_4$-$C_{20}$ α-olefins, based on total weight of the polymer, and having the following properties: (i) crystallinity derived from ethylene; (ii) a heat of fusion of about 20 to about 85 J/g; (iii) a polydispersity index ($M_w/M_n$) of less than about 2.5; (iv) a reactivity ratio of about 0.5 to about 1.5; (v) a proportion of inversely inserted propylene units based on 2, 1 insertion of propylene monomer in all propylene insertions, as measured by $^{13}$C NMR of less than 0.5 wt %; and (vi) a branching index greater than about 0.5; wherein the polymer is prepared in a single reactor; and (b) a low crystalline polymer blend composition, comprising: (i) from 65 wt % to 90 wt % based on the total weight of the blend of an ethylene α-olefin elastomer having either no crystallinity or crystallinity derived from ethylene, having 70 wt % or more units derived from ethylene; and (ii) from 10 wt % to 35 wt % based on the total weight of the blend of a propylene polymer having 40 wt % or more units derived from propylene, including isotactically arranged propylene derived sequences; wherein the ethylene α-olefin elastomer and the propylene polymer are prepared in separate reactors arranged in parallel configuration.

DETAILED DESCRIPTION OF THE PRESENT INVENTION

Various specific embodiments and versions of the present invention will now be described, including preferred embodiments and definitions that are adopted herein. While the following detailed description gives specific preferred embodiments, those skilled in the art will appreciate that these embodiments are exemplary only, and that the present invention can be practiced in other ways. Any reference to the "invention" may refer to one or more, but not necessarily all, of the present inventions defined by the claims. The use of headings is for purposes of convenience only and does not limit the scope of the present invention.

As used herein, a "polymer" may be used to refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," "ethylene copolymer," and "ethylene-based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)). Furthermore, the term "polyethylene composition" means a composition containing one or more polyethylene components. Likewise, as used herein, the terms "polypropylene," "propylene polymer," "propylene copolymer," and "propylene-based polymer" mean a polymer or copolymer comprising at least 50 mol % propylene units (preferably at least 70 mol % propylene units, more preferably at least 80 mol % propylene units, even more preferably at least 90 mol % propylene units, even more preferably at least 95 mol % propylene units or 100 mol % propylene units (in the case of a homopolymer)). Furthermore, the term "polypropylene composition" means a composition containing one or more polypropylene components.

For purposes of this invention and the claims thereto, an ethylene polymer having a density of 0.910 to 0.940 g/cm$^3$ is referred to as a "low density polyethylene" (LDPE); an ethylene polymer having a density of 0.890 to 0.930 g/cm$^3$, typically from 0.910 to 0.930 g/cm$^3$, that is linear and does not contain a substantial amount of long-chain branching is referred to as "linear low density polyethylene" (LLDPE) and can be produced with conventional Ziegler-Natta catalysts, vanadium catalysts, or with metallocene catalysts in gas phase reactors, high pressure tubular reactors, and/or in slurry reactors and/or with any of the disclosed catalysts in solution reactors ("linear" means that the polyethylene has no or only a few long-chain branches, typically referred to as a g'vis of 0.97 or above, preferably 0.98 or above); and an ethylene polymer having a density of more than 0.940 g/cm$^3$ is referred to as a "high density polyethylene" (HDPE).

As used herein, when a polymer is referred to as comprising a monomer, the monomer is present in the polymer in the polymerized form of the monomer or in the derivative form of the monomer. When a polymer is said to comprise a certain percentage, wt %, of a monomer, that percentage of monomer is based on the total amount of monomer units in the polymer.

As used herein, "core" layer, "outer" layer, and "inner" layer are merely identifiers used for convenience, and shall not be construed as limitation on individual layers, their relative positions, or the laminated structure, unless otherwise specified herein.

As used herein, film layers that are the same in composition and in thickness are referred to as "identical" layers.

As used herein, a film "free of" a component refers to a film substantially devoid of the component, or comprising the component in an amount of less than about 0.01 wt %, based on total weight of the film.

Propylene-Based Polymer

In one aspect of the present invention, the multilayer film of the present invention comprises in the core layer about 100 wt % of a propylene-based polymer, based on total weight of polymer in the core layer. The "propylene-based polymer" or "polypropylene" that is useful in the multilayer film described herein is a homopolymer or copolymer comprising from 60 wt % or 70 wt % or 80 wt % or 85 wt % or 90 wt % or 95 wt % or 98 wt % or 99 wt % to 100 wt % propylene-derived units (and comprising within the range of from 0 wt % or 1 wt % or 5 wt % to 10 wt % or 15 wt % or 20 wt % or 30 wt % or 40 wt % $C_2$ and/or $C_4$ to $C_{10}$ α-olefin derived units) and can be made by any desirable process using any desirable catalyst as is known in the art, such as a Ziegler-Nana catalyst, a metallocene catalyst, or other single-site catalyst, using solution, slurry, high pressure, or gas phase processes. Polypropylene copolymers are useful polymers in certain embodiments, especially copolymers of propylene with ethylene and/or butene, and comprise propylene-derived units within the range of from 70 wt % or 80 wt % to 95 wt % or 98 wt % by weight of the polypropylene copolymer. In any case, useful propylene-based polymers have a melting point (ASTM D3418) of at least 125° C. or 130° C. or 140° C. or 150° C. or 160° C., or within a range of from 125° C. or 130° C. to 140° C. or 150° C. or 160° C. A "highly crystalline" propylene-based polymer is useful in certain embodiments, and is typically isotactic and comprises 100 wt % propylene-derived units (polypropylene homopolymer) and has a relatively high melting point of greater than or equal to 140° C. or 145° C. or 150° C. or 155° C. or 160° C. or 165° C.

The term "crystalline," as used herein, characterizes those polymers which possess high degrees of inter- and intramolecular order. Preferably, the propylene-based polymer has a heat of fusion ($H_f$) greater than 60 J/g or 70 J/g or 80 J/g, as determined by DSC analysis. The heat of fusion is dependent on the composition of the propylene-based polymer; the thermal energy for the highest order of propylene-based polymer is estimated at 189 J/g that is, 100% crystallinity is equal to a heat of fusion of 189 J/g. A polypropylene homopolymer will have a higher heat of fusion than a copolymer or blend of homopolymer and copolymer. Also, the propylene-based polymers useful herein may have a glass to transition temperature (ISO 11357-1, $T_g$) preferably between −20° C. or −10° C. or 0° C. to 10° C. or 20° C. or 40° C. or 50° C. Preferably, the propylene-based polymers have a Vicat softening temperature (ISO 306, or ASTM D1525) of greater than 120° C. or 110° C. or 105° C. or 100° C., or within a range of from 100° C. or 105° C. to 110° C. or 120° C. or 140° C. or 150° C., or a particular range of from 110° C. or 120° C. to 150° C.

Preferably, the propylene-based polymer has a melt flow rate ("MFR", 230° C., 2.16 kg, ASTM D1238) within the range of from 0.1 g/10 min or 0.5 g/10 min or 1 g/10 min to 4 g/10 min or 6 g/10 min or 8 g/10 min or 10 g/10 min or 12 g/10 min or 16 g/10 min or 20 g/10 min. Suitable grades of propylene-based polymer that are useful in the oriented films described herein include those made by ExxonMobil, LyondellBasell, Total, Borealis, Japan Polypropylene, Mitsui, and other sources.

In particular, the propylene-based polymer present in the core layer of the multilayer film described herein may be optionally in a blend with one or more other polymers, such as propylene-based polymers defined herein, which blend is referred to as polypropylene composition. In particular, the polypropylene compositions described herein may be physical blends or in situ blends of more than one type of polypropylene or compositions of polypropylenes with polymers other than polypropylenes where the polypropylene component is the majority component, e.g., greater than 50 wt % of the total weight of the composition.

In one preferred embodiment, the propylene-based polymer may comprise one or more of (i) a polypropylene homopolymer; and (ii) a copolymer derived from propylene and one or more $C_2$ and/or $C_4$ to $C_{10}$ α-olefin comonomers, wherein the copolymer has at least about 60 wt % propylene-derived units, based on total weight of the copolymer. More preferably, the propylene-based polymer is a polypropylene homopolymer.

Ethylene Copolymer

In another aspect of the present invention, the multilayer film described herein comprises in at least one of the inner layers about 100 wt % of an ethylene copolymer, based on total weight of polymer in the inner layer. Suitable ethylene copolymers that can be used for the multilayer film described herein may include one or more of the following: (a) a low crystalline polymer comprising greater than or equal to about 70 wt % units derived from ethylene, less than or equal to about 30 wt % units derived from propylene, and less than about 5 wt % of units derived from $C_4$-$C_{20}$ α-olefins, based on total weight of the polymer, and having the following properties: (i) crystallinity derived from ethylene; (ii) a heat of fusion of about 20 to about 85 J/g; (iii) a polydispersity index ($M_w/M_n$) of less than about 2.5; (iv) a reactivity ratio of about 0.5 to about 1.5; (v) a proportion of inversely inserted propylene units based on 2, 1 insertion of propylene monomer in all propylene insertions, as measured by $^{13}C$ NMR of less than about 0.5 wt %; and (vi) a branching index greater than about 0.5; wherein the polymer is prepared in a single reactor; and (b) a low crystalline polymer blend composition, comprising: (i) from 65 wt % to 90 wt % based on the total weight of the blend of an ethylene α-olefin elastomer having either no crystallinity or crystallinity derived from ethylene, having 70 wt % or more units derived from ethylene; and (ii) from 10 wt % to 35 wt % based on the total weight of the blend of a propylene polymer having 40 wt % or more units derived from propylene, including isotactically arranged propylene derived sequences; wherein the ethylene α-olefin elastomer and the propylene polymer are prepared in separate reactors arranged in parallel configuration.

Low Crystalline Ethylene Polymer

In one preferred embodiment, the ethylene copolymer used in the multilayer film described herein may comprise a low crystalline ethylene polymer. The low crystalline ethylene polymers described herein are predominantly ethylene, i.e., having more than 70 wt % units derived from ethylene monomer. In one or more of the compositions described herein, the ethylene content of the ethylene polymer is greater than or equal to about 70 wt %, preferably greater than about 75 wt % or 77 wt % to less than about 85 wt % or about 90 wt %. In an embodiment, the ethylene polymer has a propylene content of less than about 30 wt %, preferably 25%, or 23 wt % to greater than about 15 wt % or about 10 wt %. In an embodiment, the ethylene polymer has a $C_4$-$C_{20}$ α-olefin content of less than about 5 wt %.

Preferably, the low crystalline polymer has some crystalline (including "semi-crystalline"), also referred to herein as "crystallinity derived from ethylene." But any crystallinity of the polymer is preferably derived from the ethylene. The percent crystallinity in such cases is measured as a percentage of polyethylene crystallinity and thus the origin of the crystallinity from ethylene is established.

Preferably, in addition to units derived from ethylene, the polymer also includes units derived from an α-olefin monomer. Suitable α-olefin monomers include, but are not limited to propylene, butene, pentene, hexene, heptene, or octene, and their isomers. Advantageously, the polymer can be formulated using different α-olefin monomers, selected from the list above, and/or different amounts of monomers, e.g., ethylene and α-olefin monomers, to prepare different types of polymers, e.g., ethylene polymers having desired properties.

Preferably, the polymer includes (or is) a polymer, which is preferably an ethylene polymer (including ethylene-cyclic olefin and ethylene α-olefin-diolefin) having high molecular weight (as measured by Mooney Viscosity) and low crystallinity. The polymer can be prepared utilizing any appropriate catalyst, but preferably the catalyst described below. Any number of polymers having a selected composition (e.g., monomer type and content) and properties can be formed.

The low crystalline polymer can be prepared by polymerizing in a polymerization zone in a solvent a combined feed of a monomer system and a catalyst system to provide a mixture that includes the ethylene polymer, said ethylene polymer preferably being a random copolymer of ethylene and propylene derived units, wherein the ethylene polymer is either non-crystalline or has ethylene-type crystallinity.

In a broadest form, the low crystalline ethylene polymer can be prepared using any single sited catalyst. Such a catalyst may be a transition metal complex generally containing a transition metal Groups 3 to 10 of the Periodic Table; and at least one ancillary ligand that remains bonded to the transition metal during polymerization. Preferably the transition metal is used in a reduced cationic state and stabilized by a cocatalyst or activator.

In at least one embodiment, a polymerization process consists of or includes a polymerization in the presence of a catalyst including a bis(cyclopentadienyl) metal compound and either (1) a non-coordinating compatible anion activator, or (2) an alumoxane activator. Non-limiting examples of catalyst systems which can be used are described in U.S. Pat. Nos. 5,198,401 and 5,391,629. In a particular aspect of this embodiment, an alumoxane activator can be used in an amount to provide a molar aluminum to metallocene ratio of from 1:1 to 20,000:1. In another particular aspect of this embodiment, a non-coordinating compatible anion activator can be used in an amount to provide a molar ratio of biscyclopentadienyl metal compound to non-coordinating anion of from 10:1 to 1:1. In yet another particular aspect of this embodiment, the polymerization reaction is conducted by reacting monomers in the presence of a catalyst system described herein at a temperature of from −0° C. to 200° C. for a time of from 1 second to 10 hours.

In certain embodiments, the low crystalline ethylene polymer of the present invention may be produced in the presence of a chiral metallocene catalyst with an activator and optional scavenger. The use of single site catalysts is preferred to enhance the homogeneity of the polymer. As only a limited tacticity is needed, many different forms of single site catalyst may be used. Possible single site catalysts are metallocenes, such as those described in U.S. Pat. No. 5,026,798, which have a single cyclopentadienyl ring, advantageously substituted and/or forming part of a polycyclic structure, and a heteroatom, generally a nitrogen atom, but possibly also a phosphorus atom or phenoxy group connected to a Group 4 transition metal, preferably titanium, but possibly zirconium or hafnium. A further example is $Me_5CpTiMe_3$ activated with $B(CF)_3$ as used to produce polypropylene with an Mn of up to 4 million. See Sassmannshausen, Bochmann, Rosch, Lilge, J. Organomet. Chem. (1997) 548, pp. 23-28.

Other possible single site catalysts are metallocenes which are bis cyclopentadienyl derivatives having a group transition metal, preferably hafnium or zirconium. Such metallocenes may be unbridged as in U.S. Pat. No. 4,522,982 or U.S. Pat. No. 5,747,621. The metallocene may be adapted for producing a polymer comprising predominantly propylene derived units as in U.S. Pat. No. 5,969,070, which uses an unbridged bis(2-phenyl indenyl) zirconium dichloride to produce a homogeneous polymer having a melting point of above 79° C. The cyclopentadienyl rings may be substituted and/or part of polycyclic systems as described in the above U.S. patents.

Other possible metallocenes include those in which the two cyclopentadienyl groups are connected through a bridge, generally a single atom bridge such as a silicon or carbon atom with a choice of groups to occupy the two remaining valencies. Such metallocenes are described in U.S. Pat. No. 6,048,950, which discloses bis(indenyl)bis (dimethylsilyl) zirconium dichloride and MAO; WO 98/27154, which discloses a dimethylsilyl bridged bisindenyl hafnium dimethyl together with a non-coordinating anion activator; EP 1 070 087, which discloses a bridged biscyclopentadienyl catalyst which has elements of asymmetry between the two cyclopentadienyl ligands to give a polymer with elastic properties; and the metallocenes described in U.S. Pat. Nos. 6,448,358 and 6,265,212.

The manner of activation of the single site catalyst can vary. Alumoxane and preferably methyl alumoxane can be used. Higher molecular weights can be obtained using non or weakly coordinating anion activators (NCA) derived and generated in any of the ways amply described in published patent art such as EP 277 004, EP 426 637, and many others. Activation generally is believed to involve abstraction of an anionic group such as the methyl group to form a metallocene cation, although according to some literature zwitterions may be produced. The NCA precursor can be an ion pair of a borate or aluminate in which the precursor cation is eliminated upon activation in some manner, e.g., trityl or ammonium derivatives of tetrakis pentafluorophenyl boron (see EP 277 004). The NCA precursor can be a neutral compound such as a borane, which is formed into a cation by the abstraction of and incorporation of the anionic group abstracted from the metallocene (see EP 426 638).

During the polymerization process described above, the appropriate catalyst may be delivered to the reactor in a variety of ways. For example, it may be delivered as a solution or slurry activated in-line just prior to the reactor, or pre-activated and pumped as an activated solution or slurry to the reactor. Polymerization is carried out in a reactor, in which reactant components (e.g., desired monomers, comonomers, catalyst/activators, scavengers, and optional modifiers) are preferably added continuously to the reactor.

In an embodiment, a catalyst mixture comprising one or more catalysts may be present in the single reactor used to prepare the low crystalline ethylene polymer.

In certain embodiments of the processes and compositions, catalysts described in U.S. Pat. No. 6,207,756 can be used in the polymerization process, and that patent is hereby incorporated by reference in its entirety, particularly the portions describing the catalyst, e.g., column 8 line 20 through column 14, line 21. Preferred catalysts are those that are isospecific. The catalyst is preferably 1,1'-bis(4-triethylsilylphenyl)methylene-(cyclopentadienyl)(3,8-di-tertiary-butyl-1-fluroenyl)hafnium dimethyl with dimethylaninlinimumtetrakis(pentafluoro-phenyl)borate activator.

The low crystalline ethylene polymer described herein, which is richer in ethylene, preferably contains about 50 to 90% ethylene, and more preferably containing 50 to 75% ethylene; is made with a metallocene catalyst in a suitable polymerization reactor vessel.

In certain methods, the monomers (also called reactants) are dissolved in a hydrocarbon solvent. The hydrocarbon solvent may be one of the monomers or may be an inert solvent. In the preferred method, a solvent, such as pentane, hexane, heptane, octane, or other paraffins, are employed. The solvents may be used in combination or singly. In some instances, cycloalkanes, or aromatic solvents, such as toluene, may also be used. Such solvents are often selected because they provide a better medium in which to dissolve the catalyst. It is also possible to use mixtures of different types of solvents.

Such processes where the reactions are carried out in a solvent are referred to herein as solution processes. Solution processes provide improved heat transfer and reduce the viscosity of the polymer, thereby making it easier to handle. The monomers are dissolved in a hydrocarbon solvent and this "mixed-feed" stream is fed to the reactor. Monomers and the solvent can also be fed to the reactor via separate inlets. Catalyst and activator are then introduced into the reactor via an injection port. The activation of the catalyst may be conducted outside the reactor and the activated catalyst complex then introduced into the reactor. In another preferred method, the catalyst components may be injected separately into the reactor, in which case, the activated complex is formed in-situ in the reactor. In certain instances, it may be preferable to inject the catalyst into the mixed feed stream prior to entering the reactor.

In another configuration, the copolymer is made in slurry reactors. The product and/or the catalyst may be present in concentrations that exceed their solubility in the solvent(s) used. The insoluble components of these species then form a slurry in the carrier fluid.

In yet another configuration, the slurry reactor is used to influence the monomer concentration in the proximity of the growing chains, thereby influencing the morphology of the copolymer.

In another embodiment, the copolymer is produced in a single plug flow reactor. The catalyst is then deactivated by introducing polar materials, such as water, alcohols, or amines, prior to further downstream purification. The polymeric product that is made is then separated from the carrying medium or solvent by several methods that are known and commonly practiced in industry. In certain methods, the polymer in solution is separated into a polymer-rich or heavy phase and a polymer-poor or lean phase. The pressure and temperature in the separator is adjusted to enhance enrichment of the polymer preferentially in the rich phase. The lighter phase which has very little polymer in it, floats to the top and is removed. The rich phase is then further concentrated by flash evaporation of the solvent before it is fed into a devolatilizing mixer or extruder. A cross-head extruder is mounted at the exit of the devolatizer to further squeeze the polymer through a die plate. In one embodiment of the invention, the polymer is directly extruded through a die plate and pelletized as it leaves the devolatizer. The polymer is cut into little pellets using an under-water pelletizer. In an embodiment, the polymer may be pelletized by a strand cutter or other pelletizers known in the industry. The pellets are conveyed to a spin dryer to remove the water. The pellets then make their way into a fluidized bed dryer to remove moisture and other volatile components. The dry product is then packaged for sale.

Low Crystalline Ethylene Polymer Blend Composition

In another preferred embodiment, the ethylene copolymer useful with the present invention may comprise a low crystalline ethylene polymer blend composition. The low crystalline ethylene polymer blend composition described herein is a reactor blend. The reactor blends include at least a first polymer (ethylene polymer) and a second polymer (propylene polymer), as discussed below. The process to make the low crystalline ethylene polymer blend composition is described in at least at U.S. Ser. No. 62/268,112, filed Dec. 16, 2015 and U.S. Ser. No. 62/315,929, filed Mar. 31, 2016, the contents of which are incorporated herein by reference.

A "reactor blend" herein distinguished from a "physical blend," the latter being the combination of two or more polymers that have already been formed and recovered before being mixed or otherwise combined, e.g., separated (which would preferably also include being devolatilized) from some or all of the remaining polymerization mixture (e.g., unreacted monomers and/or solvent) and then combined together.

The reactor blend compositions preferably include at least a propylene polymer and an ethylene polymer, although the ethylene polymer is in some cases identifiable by inference and/or by fractionation. In certain embodiments, the reactor blend includes a major portion by weight (more than 65 wt %) ethylene polymer with a minor portion (less than 35 wt %) propylene polymer.

In certain embodiments of the reactor blend, the first polymer and second polymer form a substantially homogenous reactor blend, meaning that the first polymer and second polymer are part of, or are within, or occupy, the same phase. In other embodiments of the reactor blend, the first polymer and second polymer form distinct phases of a multiphase composition. In certain multiphase embodiments, a reactor blend includes a continuous phase (either the first polymer or the second polymer), which may be a dispersed phase (dispersion) and a discontinuous phase (either the first polymer or the second polymer), which may be a matrix phase. In those embodiments, either the continuous phase or the dispersed phase may represent a major portion of the reactor blend. Also, at least one embodiment of the reactor blend is a multiphase composition having a continuous phase that includes first polymer as a minor portion of the reactor blend and a dispersed phase that includes second polymer as a major portion. Further, in any of the above embodiments, the second polymer can be crosslinked. The various polysplit ranges identified above may be used.

The blends described herein are formed in either batch or continuous "multistage polymerization," meaning that two (or more) different polymerizations (or polymerization stages) are conducted. More specifically, a multistage polymerization may involve either two or more sequential polymerizations (also referred to herein as a "series process" two or more parallel polymerizations (also referred to herein as a "parallel process"). Preferably, the polymerization is conducted in a parallel process.

The polymers made in the respective reactors of the continuous, multiple reactor solution plant are blended when in solution without prior isolation from the solvent. The blends may be the result of a series reactor operation, where the effluent of a first reactor enters a second reactor and where the effluent of the second reactor can be submitted to finishing steps involving devolatilization. The blend may also be the result of parallel reactor operation where the effluents of both reactors are combined and submitted to finishing steps. Either option provides an intimate admixture of the polymers in the devolatilized blend. Either case permits a wide variety of polysplits to be prepared whereby the proportion of the amounts of polymers produced in the respective reactors can be varied widely.

The first polymer and second polymer making up the blend composition are discussed below, followed by a section on the parallel process.

The blends described herein include a first polymer component (first polymer), which preferably is (or includes) an elastomer that is predominantly ethylene, i.e., having more than 30 wt % or 40 wt %, or 50 wt % units derived from ethylene monomer. The crystallinity, and hence other properties as well, of the first polymer are preferably different from those of the second polymer.

The first polymer described herein is predominantly ethylene, i.e., having more than 70 wt % units derived from ethylene monomer. In one or more of the compositions described herein, the ethylene content of the ethylene polymer is greater than or equal to about 65 wt %, preferably greater than about 70 wt %, or 75 wt % to less than about 85 wt % or about 90 wt %. In an embodiment, the ethylene polymer has a propylene content of less than about 30 wt %, preferably 25%, or 23 wt % to greater than about 15 wt % or about 10 wt %. In an embodiment, the ethylene polymer has a $C_4$-$C_{20}$ α-olefin content of less than about 5 wt %. Preferably, the first polymer (also referred to as the "ethylene polymer") has some crystalline (including "semi-crystalline"), also referred to herein as "crystallinity derived from ethylene." But any crystallinity of the first polymer is preferably derived from the ethylene. The percent crystallinity in such cases is measured as a percentage of polyethylene crystallinity and, thus, the origin of the crystallinity from ethylene is established.

Preferably, in addition to units derived from ethylene, the first polymer also includes units derived from an α-olefin monomer. Suitable α-olefin monomers include, but are not limited to: propylene, butene, pentene, hexene, heptene, or octene, and their isomers. Advantageously, the first polymer can be formulated using different α-olefin monomers, selected from the list above, and/or different amounts of monomers, e.g., ethylene and α-olefin monomers, to prepare different types of polymers, e.g., ethylene polymers having desired properties.

Preferably, the first polymer is formed during (or by) the first polymerization, which in the case of a parallel process, involving parallel polymerization and/or parallel reactors, the "first polymer" may be formed at the same time as the "second polymer," but the product streams (still including solvent) are combined after the first and second polymers are sufficiently formed.

As noted above, the blends herein preferably include at least a propylene polymer, which is preferably the polymer formed by a second polymerization reaction and preferably in a "second reactor" part of a parallel process.

The propylene polymer should have (at minimum) 40 wt % propylene units, and preferably more, as noted below. The propylene polymer is preferably a polypropylene copolymer having 60 wt % or more units derived from propylene, having isotactically arranged propylene derived sequences and having a heat of fusion less than 45 J/g. Also, the polypropylene copolymer preferably has at least 5 wt % non-propylene comonomer units, e.g., ethylene units, and more preferably at least 10 wt % or more ethylene units.

The propylene polymer preferably comprises at least 60 wt %, more preferably at least 75 wt % propylene-derived units. In some embodiments, the propylene polymer comprises from about 75 to about 95 wt % of propylene-derived units, more preferably from about 80 to about 90 wt % of propylene-derived units, the balance comprising one or more α-olefins. Other suitable embodiments include propylene derived units in an amount (based on the weight of propylene and α-olefin) ranging from about 75 to about 93 wt %, more preferably about 75 to about 92.5 wt %, more preferably about 75 to about 92 wt %, more preferably about 75 to about 92.5 wt %, more preferably about 82.5 to about 92.5 wt %, and more preferably about 82.5 to about 92 wt %. Corresponding α-olefin ranges include about 5 to about 25 wt %, more preferably about 7 to about 25 wt %, more preferably about 7.5 to about 25 wt %, more preferably about 7.5 to about 17.5 w % and more preferably about 8 to about 17.5 wt % (based on the weight of propylene and α-olefin). A preferred α-olefin is ethylene. The propylene polymer preferably has a MFR no higher than about 800, more preferably no higher than about 500, more preferably no higher than about 200, more preferably no higher than about 100, more preferably no higher than about 50. Particularly preferred embodiments include a propylene polymer with an MFR of from about 1 to about 25, more preferably about 1 to about 20. The crystallinity of the first polymer should be derived from isotactic polypropylene sequences. The isotacticity of the propylene polymer can be illustrated by the presence of a preponderance of the propylene residues in the polymer in mm triads. As noted elsewhere herein, the tacticity of the propylene polymer is preferably greater than the tacticity of either the reactor blend or the ethylene polymer, e.g., where the propylene polymer is isotactic and the ethylene polymer is atactic.

The crystallinity of the propylene polymer can be expressed in terms of heat of fusion. The propylene polymer of the invention can have a heat of fusion, as determined by DSC, ranging from a lower limit of 1 J/g, or 1.5 J/g, or 3 J/g, or 4 J/g, or 6 J/g, or 7 J/g or 10, to an upper limit of 20 or 30 J/g, or 40 J/g, or 50 J/g, or 60 J/g, or 75 J/g. Preferably, the heat of fusion of the propylene polymer is less than 45 J/g. Without wishing to be bound by theory, it is believed that the propylene polymer has generally isotactic crystallizable propylene sequences, and the above heats of fusion are believed to be due to the melting of these crystalline segments.

The level of crystallinity of the propylene polymer can also be reflected in its melting point. Preferably, the propylene polymer has a single melting point. However, a sample of propylene copolymer will often show secondary melting peaks adjacent to the principal peak. The highest peak is considered the melting point. The propylene polymer described herein can have a melting point by DSC within the range having an upper limit of 115° C., or 110° C., or 105° C., or 90° C., or 80° C., or 70° C., and a lower limit of 0° C., or 20° C., or 25° C., or 30° C., or 35° C., or 40° C., or 45° C. Preferably, the propylene polymer has a melting point of less than 105° C., and more preferably less than 100° C., and even more preferably less than 90° C. Also, it is preferred that the propylene polymer have a melting point greater than about 25° C., or 40° C.

For the propylene polymer, at least 75% by weight of the polymer, or at least 80% by weight, or at least 85% by weight, or at least 90% by weight, or at least 95% by weight, or at least 97% by weight, or at least 99% by weight of the polymer is soluble in a single temperature fraction, or in two adjacent temperature fractions, with the balance of the polymer in immediately preceding or succeeding temperature fractions. These percentages are fractions, for instance in hexane, beginning at 23° C. and the subsequent fractions are in approximately 8° C. increments above 23° C. Meeting such a fractionation requirement means that a polymer has statistically insignificant intermolecular differences of tacticity of the polymerized propylene. In certain embodiments, the percentage of mm triads in the propylene polymer, as determined by the method for determining triad tacticity, is in the range having an upper limit of 98% or 95% or 90% or 85% or 82% or 80% or 75%, and a lower limit of 50% or 60%. Certain propylene polymers have an isotacticity index greater than 0%, or within the range having an upper limit of 50% or 25% and a lower limit of 3% or 10%. Certain propylene polymers can have a tacticity index (m/r) within the range having an upper limit of 800 or 1000 or 1200, and those polymers may have a lower limit of 40 or 60.

The second polymerization may in certain cases be conducted in the presence of an α-olefin; thus the resulting polymer formed when such α-olefin is present will include "units derived" from such α-olefin. Either the same α-olefin or different α-olefins can be introduced to the first and second polymerizations. Particular examples of those α-olefins are $C_3$-$C_{20}$ α-olefins, include, but are not limited to propylene; butene-1; pentene-1,2-methylpentene-1,3-methylbutene-1; hexene-1,3-methylpentene-1,4-methylpentene-1,3,3-dimethylbutene-1; heptene-1; hexene-1; methylhexene-1; dimethylpentene-1 trimethylbutene-1; ethylpentene-1; octene-1; methylpentene-1; dimethylhexene-1; trimethylpentene-1; ethylhexene-1; methylethylpentene-1; diethylbutene-1; propylpentane-1; decene-1; methylnonene-1; nonene-1; dimethyloctene-1; trimethylheptene-1; ethyloctene-1; methylethylbutene-1; diethylhexene-1; dodecene-1; and hexadodecene-1.

The low crystalline elastomeric composition that comprises an ethylene polymer and a propylene polymer can be prepared by a continuous process. Such process may comprise: (1) polymerizing in a first polymerization zone in a solvent a combined feed of a first monomer system and a first catalyst system to provide a mixture that includes the ethylene polymer, said ethylene polymer preferably being a random copolymer of ethylene and propylene derived units, wherein the ethylene polymer is either noncrystalline or has ethylene-type crystallinity; (2) polymerizing in a second polymerization zone in a solvent a feed of a second monomer system and a second catalyst system capable of providing isotactic stereoregularity to sequences of propylene derived units to provide a mixture of the propylene polymer and unreacted monomers, said propylene polymer preferably having 60 wt % or more units derived from propylene, including isotactically arranged propylene derived sequences and further having a heat of fusion less than 45 J/g or a melting point less than 105° C. or both and a Mooney Viscosity (ML (1+4)@ 125° C.) of from 1 to 45; and (3) combining in the presence of the solvent the propylene polymer and the ethylene polymer wherein the combination of the propylene polymer and the ethylene polymer has a Mooney (ML 1+4 at 125° C.) of from 25 to 180, preferably 25 to 40, and a heat of fusion less than 50 J/g.

In one example of a parallel process, two reactors are configured such that monomers, catalyst(s) and solvent are fed independently to each reactor. The first and second polymerizations are preferably taking place simultaneously in a parallel process. For a particular plant design, the plant productivity is controlled by the bottleneck presented by the recycle system. With parallel reactors the residence time of each reactor can be chosen independently as long as the total solvent flow does not exceed the recycle capacity.

In a broadest form, the blend compositions can be prepared using any single sited catalyst. Such a catalyst may be a transition metal complex generally containing transition metal Groups 3 to 10 of the Periodic Table; and at least one ancillary ligand that remains bonded to the transition metal during polymerization. Preferably the transition metal is used in a reduced cationic state and stabilized by a cocatalyst or activator.

In at least one embodiment, a polymerization process consists of or includes a polymerization in the presence of a catalyst including a bis(cyclopentadienyl) metal compound and either (1) a non-coordinating compatible anion activator, or (2) an alumoxane activator. Non-limiting examples of catalyst systems which can be used are described in U.S. Pat. Nos. 5,198,401 and 5,391,629. In a particular aspect of this embodiment, an alumoxane activator can be used in an amount to provide a molar aluminum to metallocene ratio of from 1:1 to 20,000:1. In another particular aspect of this embodiment, a non-coordinating compatible anion activator can be used in an amount to provide a molar ratio of biscyclopentadienyl metal compound to non-coordinating anion of from 10:1 to 1:1. In yet another particular aspect of this embodiment, the polymerization reaction is conducted by reacting monomers in the presence of a catalyst system described herein at a temperature of from 0° C. to 200° C. for a time of from 1 second to 10 hours.

In certain embodiments, the propylene polymer of the present invention may be produced in the presence of a chiral metallocene catalyst with an activator and optional scavenger. The use of single site catalysts is preferred to enhance the homogeneity of the polymer. As only a limited tacticity is needed, many different forms of single site catalyst may be used. Possible single site catalysts are metallocenes, such as those described in U.S. Pat. No. 5,026,798, which have a single cyclopentadienyl ring, advantageously substituted and/or forming part of a polycyclic structure, and a heteroatom, generally a nitrogen atom, but possibly also a phosphorus atom or phenoxy group connected to a Group 4 transition metal, preferably titanium but possibly zirconium or hafnium. A further example is $Me_5CpTiMe_3$ activated with $B(CF)_3$ as used to produce elastomeric polypropylene with an $M_n$ of up to 4 million. See Sassmannshausen, Bochmann, Rosch, Lilge, J. Organomet. Chem. (1997) 548, 23-28.

Other possible single site catalysts are metallocenes which are bis cyclopentadienyl derivatives having a group transition metal, preferably hafnium or zirconium. Such metallocenes may be unbridged as in U.S. Pat. No. 4,522,982 or U.S. Pat. No. 5,747,621. The metallocene may be adapted for producing a polymer comprising predominantly propylene derived units as in U.S. Pat. No. 5,969,070, which uses an unbridged bis(2-phenyl indenyl) zirconium dichloride to produce a homogeneous polymer having a melting point of above 79° C. The cyclopentadienyl rings may be substituted and/or part of polycyclic systems as described in the above U.S. patents.

Other possible metallocenes include those in which the two cyclopentadienyl groups are connected through a bridge, generally a single atom bridge such as a silicon or carbon atom with a choice of groups to occupy the two remaining valencies. Such metallocenes are described in U.S. Pat. No. 6,048,950, which discloses bis(indenyl)bis (dimethylsilyl) zirconium dichloride and MAO; WO 98/27154, which discloses a dimethylsilyl bridged bisindenyl hafnium dimethyl together with a non-coordinating anion activator; EP 1 070 087, which discloses a bridged biscyclopentadienyl catalyst which has elements of asymmetry between the two cyclopentadienyl ligands to give a polymer with elastic properties; and the metallocenes described in U.S. Pat. Nos. 6,448,358 and 6,265,212.

The manner of activation of the single site catalyst can vary. Alumoxane and preferably methyl alumoxane can be used. Higher molecular weights can be obtained using non or weakly coordinating anion activators (NCA) derived and generated in any of the ways amply described in published patent art such as EP 277 004, EP 426 637, and many others. Activation generally is believed to involve abstraction of an anionic group such as the methyl group to form a metallocene cation, although according to some literature zwitterions may be produced. The NCA precursor can be an ion pair of a borate or aluminate in which the precursor cation is eliminated upon activation in some manner, e.g., trityl or ammonium derivatives of tetrakis pentafluorophenyl boron (see EP 277 004). The NCA precursor can be a neutral compound such as a borane, which is formed into a cation by the abstraction of and incorporation of the anionic group abstracted from the metallocene (see EP 426 638).

As noted elsewhere herein, polymerizations in the different reactors may, in certain embodiments, be conducted in the presence of the same catalyst mixtures, and in other embodiments be conducted in the presence of different catalyst mixtures. As used herein, the term "catalyst mixture" (catalyst system) includes at least one catalyst and at least one activator, although depending on the context, any reference herein to "catalyst" usually also implies an activator as well.

The appropriate catalyst mixture may be delivered to the respective reactor in a variety of ways. For example, it may be delivered as a solution or slurry, either separately to the reactor, activated in-line just prior to the reactor, or pre-activated and pumped as an activated solution or slurry to the reactor. Polymerizations are carried out in each reactor, in which reactant components (e.g., desired monomers, comonomers, catalyst/activators, scavengers, and optional modifiers) are preferably added continuously to the appropriate reactor. In some embodiments, both catalyst mixtures are added to the first reactor, while in other embodiments one catalyst mixture is added to the first reactor and a different catalyst mixture is added to the second reactor (although in a sequential operation at least some of the first catalyst mixture from the first reactor may be directed to the second reactor together with the product mixture from the first reactor).

In preferred embodiments, two different catalysts are added as part of different reactant feeds, e.g., a "first catalyst," which may be part of a "first reactant feed," and a "second catalyst," which may be part of a "second reactant feed," although in at least certain embodiments (e.g., series reactors) both first and second catalysts are present to some degree in the second reactor feed, e.g., when the first effluent is supplied to a second reactor. Preferably, in at least certain embodiments, the first catalyst is a chiral catalyst while the second catalyst is a non-chiral catalyst.

In certain embodiments of the processes and compositions, the same catalyst mixture can be used for each of the first and second polymerizations, whether in series or parallel. For example, in certain processes, certain catalyst mixtures described in U.S. Pat. No. 6,207,756 can be used in both polymerizations, and that patent is hereby incorporated by reference in its entirety, particularly the portions describing the catalyst mixtures, e.g., column 8 line 20 through column 14, line 21. Preferred catalysts are those that are isospecific.

The first catalyst is preferably 1,1'-bis(4-triethylsilylphenyl)methylene-(cyclopentadienyl)(3,8-di-tertiary-butyl-1-fluroenyl)hafnium dimethyl with dimethylaninliniumtetrakis(pentafluorophenyl)borate activator. The second catalyst is preferably dimethylsilylbis(indenyl)hafnium dimethyl with dimethylaniliniumtetrakis(heptafluoro-naphthyl)borate activator.

Test methods to measure crystallinity derived from ethylene, heat of fusion, reactivity ratio, proportion of inversely propylene units, and branching index are disclosed in U.S. Ser. No. 62/268112, filed Dec. 16, 2015, incorporated herein by reference.

The ethylene copolymer present in at least one of the inner layers of the multilayer film described herein may be optionally in a blend with one or more other polymers, such as ethylene copolymer defined herein, which blend is referred to as ethylene copolymer composition. The ethylene copolymer composition may include one or more different ethylene copolymers, i.e., ethylene copolymers each selected from one or more of those discussed above. Such combinations of various ethylene copolymers are all within the scope of the invention.

Other Polyethylenes

In one aspect of the present invention, a polyethylene, not falling within the definition of the ethylene copolymer described above, may be used for the multilayer film described herein, for example, in at least one of the outer layers. The polyethylene can be selected from ethylene homopolymers, ethylene copolymers, and compositions thereof. Useful copolymers comprise one or more comonomers in addition to ethylene and can be a random copolymer, a statistical copolymer, a block copolymer, and/or compositions thereof The method of making the polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the polyethylenes are made by the catalysts, activators and processes described in U.S. Pat. Nos. 6,342,566; 6,384,142; 5,741,563; WO 03/040201; and WO 97/19991. Such catalysts are well known in the art, and are described in, for example, Ziegler Catalysts (Gerhard Fink, Rolf Mülhaupt and Hans H. Brintzinger, eds., Springer-Verlag 1995); Resconi et al.; and I, II Metallocene-Based Polyolefins (Wiley & Sons 2000).

Polyethylenes that are useful in this invention other than the ethylene copolymer described herein include those sold by ExxonMobil Chemical Company, including HDPE, LLDPE, and LDPE; and those sold under the ENABLE™, EXACT™, EXCEED™, ESCORENE™, EXXCO™, ESCOR™, PAXON™, and OPTEMA™ tradenames.

Preferred ethylene homopolymers and copolymers useful in this invention typically have one or more of the following properties:

1. an $M_w$ of 20,000 g/mol or more, 20,000 to 2,000,000 g/mol, preferably 30,000 to 1,000,000, preferably 40,000 to 200,000, preferably 50,000 to 750,000, as measured by size exclusion chromatography; and/or
2. a $T_m$ of 30° C. to 150° C., preferably 30° C. to 140° C., preferably 50° C. to 140° C., more preferably 60° C. to 135° C., as determined based on ASTM D3418-03; and/or
3. a crystallinity of 5% to 80%, preferably 10% to 70%, more preferably 20% to 60%, preferably at least 30%, or at least 40%, or at least 50%, as determined based on ASTM D3418-03; and/or
4. a heat of fusion of 300 J/g or less, preferably 1 to 260 J/g, preferably 5 to 240 J/g, preferably 10 to 200 J/g, as determined based on ASTM D3418-03; and/or
5. a crystallization temperature ($T_c$) of 15° C. to 130° C., preferably 20° C. to 120° C., more preferably 25° C. to 110° C., preferably 60° C. to 125° C., as determined based on ASTM D3418-03; and/or
6. a heat deflection temperature of 30° C. to 120° C., preferably 40° C. to 100° C., more preferably 50° C. to 80° C. as measured based on ASTM D648 on injection molded flexure bars, at 66 psi load (455 kPa); and/or
7. a Shore hardness (D scale) of 10 or more, preferably 20 or more, preferably 30 or more, preferably 40 or more, preferably 100 or less, preferably from 25 to 75 (as measured based on ASTM D 2240); and/or
8. a percent amorphous content of at least 50%, preferably at least 60%, preferably at least 70%, more preferably between 50% and 95%, or 70% or less, preferably 60% or less, preferably 50% or less as determined by subtracting the percent crystallinity from 100.

The polyethylene may be an ethylene homopolymer, such as HDPE. In one embodiment, the ethylene homopolymer has a molecular weight distribution ($M_w/M_n$) or (MWD) of up to 40, preferably ranging from 1.5 to 20, or from 1.8 to 10, or from 1.9 to 5, or from 2.0 to 4. In another embodiment, the 1% secant flexural modulus (determined based on ASTM D790A, where test specimen geometry is as specified under the ASTM D790 section "Molding Materials (Thermoplastics and Thermosets)," and the support span is 2 inches (5.08 cm)) of the polyethylene falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The MI of preferred ethylene homopolymers range from 0.05 to 800 dg/min in one embodiment, and from 0.1 to 100 dg/min in another embodiment, as measured based on ASTM D1238 (190° C., 2.16 kg).

In a preferred embodiment, the polyethylene comprises less than 20 mol % propylene units (preferably less than 15 mol %, preferably less than 10 mol %, preferably less than 5 mol %, and preferably 0 mol % propylene units).

In another embodiment of the invention, the polyethylene useful herein is produced by polymerization of ethylene and, optionally, an alpha-olefin with a catalyst having, as a transition metal component, a bis (n-$C_{3-4}$ alkyl cyclopentadienyl) hafnium compound, wherein the transition metal component preferably comprises from about 95 mol % to about 99 mol % of the hafnium compound as further described in U.S. Pat. No. 9,956,088.

In another embodiment of the invention, the polyethylene is an ethylene copolymer, either random or block, of ethylene and one or more comonomers selected from $C_3$ to $C_{20}$ α-olefins, typically from $C_3$ to $C_{10}$ α-olefins. Preferably, the comonomers are present from 0.1 wt % to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably the ethylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl, pentene-1,3,5,5-trimethyl-hexene-1, and the like. The monomers may be present at up to 50 wt %, preferably from up to 40 wt %, more preferably from 0.5 wt % to 30 wt %, more preferably from 2 wt % to 30 wt %, and more preferably from 5 wt % to 20 wt %, based on the total weight of the ethylene copolymer.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha -olefins include 4-methyl-1-pentene, 3-methyl-1-pentene, 3,5,5 -trimethyl-1-hexene, and 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene and allyl benzene.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring-containing diolefins with or without substituents at various ring positions.

In a preferred embodiment, one or more dienes are present in the polyethylene at up to 10 wt %, preferably at 0.00001 wt % to 2 wt %, preferably 0.002 wt % to 1 wt %, even more preferably 0.003 wt % to 0.5 wt %, based upon the total weight of the polyethylene. In some embodiments, diene is added to the polymerization in an amount of from an upper limit of 500 ppm, 400 ppm, or 300 ppm to a lower limit of 50 ppm, 100 ppm, or 150 ppm.

Preferred ethylene copolymers useful herein are preferably a copolymer comprising at least 50 wt % ethylene and having up to 50 wt %, preferably 1 wt % to 35 wt %, even more preferably 1 wt % to 6 wt % of a $C_3$ to $C_{20}$ comonomer, preferably a $C_4$ to $C_8$ comonomer, preferably hexene or octene, based upon the weight of the copolymer. Preferably these polymers are metallocene polyethylenes (mPEs).

Useful mPE homopolymers or copolymers may be produced using mono- or bis-cyclopentadienyl transition metal catalysts in combination with an activator of alumoxane and/or a non-coordinating anion in solution, slurry, high pressure, or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Houston, Tex. under the tradename EXCEED™ Polyethylene or ENABLE™ Polyethylene.

In a class of preferred embodiments, the multilayer film described herein comprise in at least one of the outer layers a polyethylene derived from ethylene and one or more $C_3$ to $C_{20}$ α-olefin comonomers, based on total weight of polymer in the outer layer, wherein the polyethylene has a density of from about 0.900 to about 0.945 g/cm$^3$, a melt index (MI), $I_{2.16}$, of from about 0.1 to about 15 g/10 min, a molecular weight distribution (MWD) of from about 1.5 to about 5.5, and a melt index ratio (MIR), $I_{21.6}/I_{2.16}$, of from about 10 to about 100. In various embodiments, the above polyethylene may have one or more of the following properties:

(a) a density (sample prepared according to ASTM D4703, and the measurement according to ASTM D1505) of about 0.900 to 0.940 g/cm$^3$, or about 0.912 to about 0.935 g/cm$^3$;

(b) an MI ($I_{2.16}$, ASTM D1238, 2.16 kg, 190° C.) of about 0.1 to about 15 g/10 min, or about 0.3 to about 10 g/10 min, or about 0.5 to about 5 g/10 min;

(c) an MIR ($I_{21.6}$ (190° C., 21.6 kg)/$I_{2.16}$ (190° C., 2.16 kg)) of about 10 to about 100, or about 15 to about 80, or about 16 to about 50;

(d) a CDBI of up to about 85%, or up to about 75%, or about 5 to about 85%, or 10 to 75%. The CDBI may be determined using techniques for isolating individual fractions of a sample of the resin. The preferred technique is Temperature Rising Elution Fraction ("TREF"), as described in Wild, et al., J. Poly. Sci., Poly. Phys. Ed., Vol. 20, p. 441 (1982), which is incorporated herein for purposes of U.S. practice;

(e) an MWD of about 1.5 to about 5.5; MWD is measured using a gel permeation chromatograph ("GPC") equipped with a differential refractive index ("DRI") detector; and/or (f) a branching index of about 0.9 to about 1.0, or about 0.96 to about 1.0, or about 0.97 to about 1.0. Branching Index is an indication of the amount of branching of the polymer and is defined as $g'=[Rg]^2_{br}/[Rg]^2_{lin}$. "Rg" stands for Radius of Gyration, and is measured using a Waters 150 gel permeation chromatograph equipped with a Multi-Angle Laser Light Scattering ("MALLS") detector, a viscosity detector and a differential refractive index detector. "$[Rg]_{br}$" is the Radius of Gyration for the branched polymer sample and "$[Rg]_{lin}$" is the Radius of Gyration for a linear polymer sample.

The polyethylene is not limited by any particular method of preparation and may be formed using any process known in the art. For example, the polyethylene may be formed using gas phase, solution, or slurry processes.

In one embodiment, the polyethylene is formed in the presence of a metallocene catalyst. For example, the polyethylene may be an mPE produced using mono- or bis-cyclopentadienyl transition metal catalysts in combination with an activator of alumoxane and/or a non-coordinating anion in solution, slurry, high pressure, or gas phase. The catalyst and activator may be supported or unsupported and the cyclopentadienyl rings may be substituted or unsubstituted. mPEs useful as the first polyethylene include those commercially available from ExxonMobil Chemical Company in Houston, Tex., such as those sold under the trade designation EXCEED™ or ENABLE™.

In another preferred embodiment, at least one of the outer layers of the multilayer film described herein further comprises an LDPE (as a polyethylene described herein). The LDPEs that are useful in the multilayer films described herein are ethylene-based polymers produced by free radical initiation at high pressure in a tubular or autoclave reactor as well known in the art. The LDPEs have a medium to broad MWD determined according to the procedure disclosed herein of higher than 4, preferably from 5 to 40, and a high level of long chain branching as well as some short chain branching. The density is generally greater than 0.910 g/cm$^3$ and is preferably from 0.920 to 0.940 g/cm$^3$. The MI may be less than 0.55 or 0.45 g/10 min. In one embodiment, the at least one of the outer layers may contain more than one type of LDPE.

The polyethylene described herein may be present, e.g., in at least one of the outer layers, optionally in a blend with one or more other polymers, such as polyethylenes defined herein, which blend is referred to as polyethylene composition. In particular, the polyethylene compositions described herein may be physical blends or in situ blends of more than one type of polyethylene or compositions of polyethylenes with polymers other than polyethylenes where the polyethylene component is the majority component, e.g., greater than 50 wt % of the total weight of the composition. Preferably, the polyethylene composition is a blend of two polyethylenes with different densities. In a preferred embodiment, at least one of the outer layers comprises a polyethylene derived from ethylene and one or more $C_3$ to $C_{20}$ α-olefin comonomers, wherein the polyethylene has a density of from about 0.900 to about 0.945 g/cm$^3$, a melt index (MI), $I_{2.16}$, of from about 0.1 to about 15 g/10 min, a molecular weight distribution (MWD) of from about 1.5 to about 5.5, and a melt index ratio (MIR), $I_{21.6}/I_{2.16}$, of from about 10 to about 100, present in an amount of at least about 80 wt %, for example, about 80 wt %, about 81 wt %, about 82 wt %, about 83 wt %, about 84 wt %, about 85 wt %, about 86 wt %, about 87 wt %, about 88 wt %, about 89 wt %, about 90 wt %, about 91 wt %, about 92 wt %, about 93 wt %, about 94 wt %, about 95 wt %, about 96 wt %, about 97 wt %, about 98 wt %, about 99 wt %, or about 100 wt %, based on total weight of polymer in the outer layer.

It has been surprisingly discovered that introduction of the propylene-based polymer and the elastic ethylene copolymer described herein into the core layer and the inner layers, respectively, to prepare a multilayer film can achieve simultaneous improvement in and optimized balance between stiffness-related and toughness-related properties normally repulsive to each other, such as stiffness and tear resistance. Specifically, the propylene-based polymer in the core layer may mostly contribute to enhanced stiffness-related properties while the elastic copolymer in the inner layers may play a major role in highlighting toughness-related properties. Accordingly, by conforming to the structure-wise composition set out herein, presence of both the propylene-based polymer and the elastic ethylene copolymer described herein can cooperate to benefit the inventive film with advantage in outstanding mechanical profile over conventional film solutions where either the propylene-based polymer or the elastic ethylene copolymer is absent.

Film Structures

The multilayer film of the present invention may further comprise additional layer(s), which may be any layer typically included in multilayer film constructions. For example, the additional layer(s) may be made from:

1. Polyolefins. Preferred polyolefins include homopolymers or copolymers of $C_2$ to $C_{40}$ olefins, preferably $C_2$ to $C_{20}$ olefins, preferably a copolymer of an α-olefin and another olefin or α-olefin (ethylene is defined to be an α-olefin for purposes of this invention). Preferably polyolefins include: homopolyethylene, homopolypropylene, propylene copolymerized with ethylene and/or butene, ethylene copolymerized with one or more of propylene, butene or hexene, and optional dienes. Preferred examples include thermoplastic polymers such as ultra-low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and compositions of thermoplastic polymers and elastomers, such as, for example, thermoplastic elastomers and rubber toughened plastics.

2. Polar polymers. Preferred polar polymers include homopolymers and copolymers of esters, amides, acetates, anhydrides, copolymers of a $C_2$ to $C_{20}$ olefin, such as ethylene and/or propylene and/or butene with one or more polar monomers, such as acetates, anhydrides, esters, alcohol, and/or acrylics. Preferred examples include polyesters, polyamides, ethylene vinyl acetate copolymers, and polyvinyl chloride.

3. Cationic polymers. Preferred cationic polymers include polymers or copolymers of geminally disubstituted olefins, α-heteroatom olefins and/or styrenic monomers. Preferred geminally disubstituted olefins include isobutylene, isopentene, isoheptene, isohexane, isooctene, isodecene, and isododecene. Preferred α-heteroatom olefins include vinyl ether and vinyl carbazole, preferred styrenic monomers include styrene, alkyl styrene, para-alkyl styrene, α-methyl styrene, chloro-styrene, and bromo-para-methyl styrene. Preferred examples of cationic polymers include butyl rubber, isobutylene copolymerized with para methyl styrene, polystyrene, and poly-α-methyl styrene.

4. Miscellaneous. Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbond fibers, and non-wovens (particularly polypropylene spunbond fibers or non-wovens), and substrates coated with inks, dyes, pigments, and the like.

In particular, a multilayer film can also include layers comprising materials such as ethylene vinyl alcohol (EVOH), polyamide (PA), polyvinylidene chloride (PVDC), or aluminium, so as to obtain barrier performance for the film where appropriate.

In one aspect of the invention, the multilayer film described herein may be produced in a stiff oriented form (often referred to as "pre-stretched" by persons skilled in the art) and may be useful for laminating to inelastic materials, such as polyethylene films, biaxially oriented polyester (e.g., polyethylene terephthalate (PET)) films, biaxially oriented polypropylene (BOPP) films, biaxially oriented polyamide (nylon) films, foil, paper, board, or fabric substrates, or may further comprise one of the above substrate films to form a laminate structure.

The thickness of the multilayer films may range from 10 to 200 µm in general and is mainly determined by the intended use and properties of the film. Stretch films may be thin; those for shrink films or heavy duty bags are much thicker. Conveniently, the film has a thickness of from 10 to 200 µm, from 20 to 150 µm, from 25 to 100 µm, or from 30 to 60 µm. The total thickness of the two outer layers may be at most about two thirds, for example, to about one tenth, about one fifth, about one third, about two fifths, about half, about three fifths, about two thirds, or in the range of any combinations of the values recited herein, of the total thickness of the multilayer film. The total thickness of the two inner layers may be at most about 50%, for example, about 10%, about 20%, about 30%, about 40%, about 50%, or in the range of any combinations of the values recited herein, of the total thickness of the multilayer film.

The multilayer film described herein may have an A/B/X/B/A structure wherein A are outer layers and X represents the core layer and B are inner layers between the core layer and each outer layer. The composition of the A layers may be the same or different, but conform to the limitations set out herein. Preferably, the two A layers are identical. The composition of the B layers may also be the same or different, but conform to the limitations set out herein. Preferably, the two B layers are identical.

In a preferred embodiment, the multilayer film has a five-layer A/B/X/B/A structure, comprising: (a) two outer layers ("A"), each comprising: (i) at least about 80 wt % of a polyethylene derived from ethylene and one or more $C_3$ to $C_{20}$ α-olefin comonomers, based on total weight of polymer in the outer layer, wherein the polyethylene has a density of from about 0.900 to about 0.945 g/cm³, an MI, $I_{2.16}$, of from about 0.1 to about 15 g/10 min, an MWD of from about 1.5 to about 5.5, and an MIR, $I_{21.6}/I_{2.16}$, of from about 10 to about 100; and (ii) an LDPE; (b) a core layer between the two outer layers, the core layer comprising about 100 wt % of a polypropylene homopolymer, based on total weight of polymer in the core layer; and (c) two inner layers ("B") each between the core layer ("X") and each outer layer ("A"), wherein each of the inner layers comprises about 100 wt % of an ethylene copolymer, based on total weight of polymer in the inner layer, wherein the ethylene copolymer is: (a') a low crystalline polymer comprising greater than or equal to about 70 wt % units derived from ethylene, less than or equal to about 30 wt % units derived from propylene, and less than about 5 wt % of units derived from $C_4$-$C_{20}$ α-olefins, based on total weight of the polymer, and having the following properties: (i) crystallinity derived from ethylene; (ii) a heat of fusion of about 20 to about 85 J/g; (iii) a polydispersity index ($M_w/M_n$) of less than about 2.5; (iv) a reactivity ratio of about 0.5 to about 1.5; (v) a proportion of inversely inserted propylene units based on 2, 1 insertion of propylene monomer in all propylene insertions, as measured by $^{13}C$ NMR of less than 0.5 wt %; and (vi) a branching index greater than about 0.5; wherein the polymer is prepared in a single reactor; or (b') a low crystalline polymer blend composition, comprising: (i) from 65 wt % to 90 wt % based on the total weight of the blend of an ethylene α-olefin elastomer having either no crystallinity or crystallinity derived from ethylene, having 70 wt % or more units derived from ethylene; and (ii) from 10 wt % to 35 wt % based on the total weight of the blend of a propylene polymer having 40 wt % or more units derived from propylene, including isotactically arranged propylene derived sequences; wherein the ethylene α-olefin elastomer and the propylene polymer are prepared in separate reactors arranged in parallel configuration; wherein the multilayer film has: (i) a 1% Secant Modulus of at least about 20%, 50%, or 100%, preferably 120%, preferably 140% higher in Machine Direction (MD) and of at least about 20%, 50%, or 100%, preferably 115%, preferably 130% higher in Transverse Direction (TD); and (ii) an Elmendorf tear of at least about 20%, preferably 55% higher in MD and of at least about 20%, preferably 45% higher in TD, compared to that of a film free of the propylene-based polymer in the core layer and the ethylene copolymer in the inner layer, but is otherwise identical in terms of film structure, layers' compositions and the film's overall thickness. Preferably, the thickness ratio between each of the outer layers, each of the inner layers, and the core layer is about 2:1:2.

In an embodiment, the multilayer film has a three-layer A+B/X/A+B structure, A/B+X/A, B/A+X/B, or a B+X/A/B+X structure. The "+" in the film structure indicates that the components are blended in the layer.

In an embodiment, the multilayer film has a five layer X/B/A/B/X structure.

In an embodiment, the multilayer film has a seven layer A/B/X/B/X/B/A structure.

In an embodiment, the multilayer film has a nine layer A/B/X/B/X/B/X/B/A structure.

It is appreciated that multilayer structures of a variety of combinations, preferably where a B layer is in between the A and X layer, are also envisioned by this invention.

Film Properties and Applications

The multilayer film described herein or made according to any method disclosed herein may have: (i) a 1% Secant Modulus of at least about 20%, 50%, or 140% higher in Machine Direction (MD) and of at least about 20%, 50%, or 130% higher in Transverse Direction (TD); and (ii) an Elmendorf tear of at least about 55% higher in MD and of at least about 45% higher in TD, compared to that of a film free of the propylene-based polymer in the core layer and the ethylene copolymer in the inner layer, but is otherwise identical in terms of film structure, layers' compositions, and the film's overall thickness.

The multilayer films of the present invention may be particularly adapted to a wide variety of film applications, including trash bags, adult care items, agricultural films, aluminum foil laminates, aluminum laminates, asphalt films, auto panel films, bacon packaging, bag-in-box liquid packaging applications, bakery goods, banana film, batch inclusion bags, bathroom tissue overwrap, biaxially oriented films, biaxially oriented polypropylene (BOPP) films, biscuit packages, boutique bags, bread bags, bubble wrap, building film, cake mix packaging, can liners, candy wrap, cardboard liquid packaging, carpet film, carry-out sacks, cement packaging, cereal liners, cheese packaging, chemical packaging, clarity films, coffee packaging, coin bags, collation shrink films, confectionary packaging, construction sheeting, construction film, consumer goods, consumer trash bags, continuous wrap, convenience packaging, cosmetics packaging, counter bags, cover film, cup/cutlery overwrap, deli and bakery wrap, detergent packaging, diaper backsheet, disposables (diapers, sanitary, etc.), dry food packaging, dry grains, dunnage bags, fertilizer, fish & seafood packaging, food packaging, foundation film, freeze-dried products, freezer films, frozen food, fruit juice packaging, furniture bags, garden sacks, garment bags, geomembrane liners, gloves, gravel bags, green house films, grocery sacks, heavy duty-sacks, high clarity collation shrink film, high clarity films, high speed packaging applications, high stiffness overwrap film, horizontal form-fill-and-seal (HFFS) packaging, household wrap, hygiene overwrap films, ice bags, incision drape, industrial hardware packaging, industrial liner, industrial trash bags, industrial spare parts packaging, in store self-service bags, insulation bags, institutional liners, juice bags, kitchen rolls, landscaping bags, lamination films, light duty shrink film, lime bags, liners, liquid packaging, liquid and granular food packaging, low stiffness overwrap film, magazine overwrap, mailer bags, mailers envelopes/sacks, masking film, mayonnaise packaging, meat packaging, medical products, medical draping, medium duty bags, merchandise bags, metallized laminates, military hardware packaging, milk bags, milk powder packaging, modified atmosphere packaging, mulch film, multiwall sack liner, newspaper bags, nose tissue overwrap, olive oil packaging, packaging of beans, packaging of cementation products such as grout, packaging of dry and sharp products, pallet shrink film, pancake batter bags, paper handkerchief overwrap, paper laminates, pasta overwrap, pelletized polymer, perfume packaging, personal care packaging, pesticides packaging, pharmaceuticals packaging, pigment packaging, pizza packaging, polyamide laminates, polyester laminates, potato product packaging, potting soil bags, pouches, poultry packaging, pre-formed pouches, produce bags, produce packaging, rack and counter film, ready-made food packaging, ready meal packaging, retortable product packaging, films for the rubber industry, sandwich bags, salt bags, sausage packaging, seafood packaging, shipping sacks, shrink bags, shrink bundling film, shrink film, shrink shrouds, shrink tray, shrink wrap, snack food packaging, soft drink packaging, soil bags, soup packaging, spice packaging, stand up pouches, storage bags, stretch films, stretch hooders, stretch wrap, supermarket bags, surgical garb, takeout food bags, textile films, refuse bags, thermoformed containers, thin films, tissue overwrap, tobacco packaging, tomato packaging, ketchup packaging, trash bags, t-shirt bags, vacuum skin packaging, vegetable packaging, vertical form-fill-and-seal (FFS) packaging, horizontal FFS packaging, tubular FFS packaging, and water bottle packaging.

By using the structure-wise formulation design as set out herein, the longstanding bottleneck in synchronizing improvement in stiffness and tear resistance without strengthening one at the expense of compromising the other can be well addressed.

Methods for Making the Multilayer Film

Also provided are methods for making multilayer films of the present invention. A method for making a multilayer film may comprise the steps of: (a) preparing two outer layers; (b) preparing a core layer between the two outer layers, the core layer comprising about 100 wt % of a propylene-based polymer, based on total weight of polymer in the core layer; (c) preparing two inner layers each between the core layer and each outer layer, wherein at least one of the inner layers comprises about 100 wt % of an ethylene copolymer, based on total weight of polymer in the inner layer; and (d) forming a film comprising the layers in steps (a) to (c); wherein the multilayer film has: (i) a 1% Secant Modulus of at least about 20%, 50%, or 100%, preferably 120%, preferably 140% higher in Machine Direction (MD) and of at least about 20%, 50%, or 100%, preferably 115%, preferably 130% higher in Transverse Direction (TD); and (ii) an Elmendorf tear of at least about 20%, preferably 55% higher in MD and of at least about 20%, preferably 45% higher in TD, compared to that of a film free of the propylene-based polymer in the core layer and the ethylene copolymer in the inner layer, but is otherwise identical in terms of film structure, layers' compositions, and the film's overall thickness.

The multilayer films described herein may be formed by any of the conventional techniques known in the art including blown extrusion, cast extrusion, coextrusion, blow molding, casting, and extrusion blow molding.

In one embodiment, the multilayer films of the present invention are formed by using blown techniques, i.e., to form a blown film. For example, the composition described herein can be extruded in a molten state through an annular die and then blown and cooled to form a tubular, blown film, which can then be axially slit and unfolded to form a flat film. As a specific example, blown films can be prepared as follows. The polymer composition is introduced into the feed hopper of an extruder, such as a 50 mm extruder that is water-cooled, resistance heated, and has an L/D ratio of 30:1. The film can be produced using a 28 cm W&H die with a 1.4 mm die gap, along with a W&H dual air ring and internal bubble cooling. The film is extruded through the die into a film cooled by blowing air onto the surface of the film. The film is drawn from the die typically forming a cylindrical film that is cooled, collapsed, and, optionally, subjected to a desired auxiliary process, such as slitting, treating, sealing, or printing. Typical melt temperatures are from about 180° C. to about 230° C. Blown film rates are generally from about 3 to about 25 kilograms per hour per inch (about 4.35 to about 26.11 kilograms per hour per centimeter) of die circumference. The finished film can be wound into rolls for later processing. A particular blown film process and apparatus suitable for forming films according to embodiments of the present invention is described in U.S. Pat. No. 5,569,693. Of course, other blown film forming methods can also be used.

The compositions prepared as described herein are also suited for the manufacture of blown film in a high-stalk extrusion process. In this process, a polyethylene melt is fed through a gap (typically 0.5 to 1.6 mm) in an annular die attached to an extruder and forms a tube of molten polymer which is moved vertically upward. The initial diameter of the molten tube is approximately the same as that of the annular die. Pressurized air is fed to the interior of the tube to maintain a constant air volume inside the bubble. This air pressure results in a rapid 3-to-9-fold increase of the tube diameter, which occurs at a height of approximately 5 to 10 times the die diameter above the exit point of the tube from the die. The increase in the tube diameter is accompanied by a reduction of its wall thickness to a final value ranging from approximately 10 to 50 μm and by a development of biaxial orientation in the melt. The expanded molten tube is rapidly cooled (which induces crystallization of the polymer), collapsed between a pair of nip rolls and wound onto a film roll.

In blown film extrusion, the film may be pulled upwards by, for example, pinch rollers after exiting from the die and is simultaneously inflated and stretched transversely sideways to an extent that can be quantified by the blow up ratio (BUR). The inflation provides the transverse direction (TD) stretch, while the upwards pull by the pinch rollers provides a machine direction (MD) stretch. As the polymer cools after exiting the die and inflation, it crystallizes and a point is reached where crystallization in the film is sufficient to prevent further MD or TD orientation. The location at which further MD or TD orientation stops is generally referred to as the "frost line" because of the development of haze at that location.

Variables in this process that determine the ultimate film properties include the die gap, the BUR and TD stretch, the take up speed and MD stretch and the frost line height. Certain factors tend to limit production speed and are largely determined by the polymer rheology, including the shear sensitivity, which determines the maximum output and the melt tension which limits the bubble stability, BUR and take up speed.

A laminate structure with the inventive multilayer film prepared as described herein can be formed by lamination to a substrate film using any process known in the art, including solvent based adhesive lamination, solvent less adhesive lamination, extrusion lamination, heat lamination, etc.

EXAMPLES

The present invention, while not meant to be limited, may be better understood by reference to the following example and tables.

The example illustrates stiffness and tear resistance demonstrated by inventive samples (Samples 1-6) of five layers comprising 100 wt % (based on total weight of polymer in the core layer) of a polypropylene homopolymer in the core layer and 100 wt % (based on total weight of polymer in the inner layer) of an elastic ethylene copolymer in each inner layer between the core layer and each outer layer, in comparison with comparative samples (Samples A-D) using other polymers in place of the elastic ethylene copolymer alone or in place of both the polypropylene homopolymer and the elastic ethylene copolymer, but otherwise identical in terms of film structure, layers' compositions, and the film's overall thickness.

Polymer products used in the samples include: Moplen HP456J polypropylene homopolymer resin (MFR (230° C./2.16 kg): 3.4 g/10 min) (LyondellBasell Industries N.V., Netherlands); low crystalline ethylene-propylene polymers EP1 (ethylene content: 78 wt %, density: 0.880 g/cm$^3$), EP2 (ethylene content: 74 wt %, density: 0.873 g/cm$^3$), EP3 (ethylene content: 85 wt %, density: 0.892 g/cm$^3$), and EP 4 (ethylene content: 86 wt %, density: 0.892 g/cm$^3$) (ExxonMobil Chemical Company, Houston, Tex., USA); low crystalline ethylene-propylene blend compositions EP5 (ethylene content: 74 wt %, density: 0.879 g/cm$^3$) and EP6 (ethylene content: 73 wt %, density: 0.873 g/cm$^3$) (ExxonMobil Chemical Company, Houston, Tex., USA); VISTAMAXX™ 6102FL performance polymer (ethylene content: 16 wt %, density: 0.862 g/cm$^3$, MFR (230° C./2.16 kg): 3 g/10 min) and VISTAMAXX™ 3020FL performance polymer (ethylene content: 11 wt %, density: 0.874 g/cm$^3$, MFR (230° C./2.16 kg): 3 g/10 min) (ExxonMobil Chemical Company, Houston, Tex., USA); EXCEED™ 1018KB mPE resin (density: 0.918 g/cm$^3$, MI (190° C./2.16 kg): 1.0 g/10 min) and EXCEED™ 1018HA mPE resin (density: 0.918 g/cm$^3$, MI (190° C./2.16 kg): 1.0 g/10 min) (ExxonMobil Chemical Company, Houston, Tex., USA); and EXXONMOBIL™ LDPE LD 150BW LDPE resin (density: 0.923 g/cm$^3$, MI: 0.75 g/10 min) (ExxonMobil Chemical Company, Houston, Tex., USA). All samples were prepared with a thickness of 50 μm at a layer thickness ratio of 2:1:2:1:2 on a W&H coextrusion blown film line with a BUR of 2.5. Samples were conditioned at 23° C.±2° C. and 50%±10% relative humidity for at least 40 hours prior to determination of all properties. Structure-wise formulations of the film samples and test results thereof are respectively depicted in Tables 1 and 2.

The films of the examples (Samples 1-6 and A-C) are 5 layer blown films using a dual lip internal bubble cooling system. The die diameter was 280 mm, die gap was 1.4 mm, film thickness was 50 μm, blow up ratio was 2.5, total output was between about 225-230 kg/hr for Samples 1-6 and about 200 kg/hr for Sample A, and about 120 kg/hr for Samples B-D, the frost line height was about 1000 mm for Samples 1-6 and Sample A, and about 800 mm for Samples B-D.

1% Secant modulus of the films were measured in both MD and TD by a method based on ASTM D882 with static weighing and a constant rate of grip separation using a Zwick 1445 tensile tester with a 200N. Since rectangular shaped test samples were used, no additional extensometer was used to measure extension. The nominal width of the tested film sample is 15 mm and the initial distance between the grips is 50 mm. A pre-load of 0.1N was used to compensate for the so called TOE region at the origin of the stress-strain curve. The constant rate of separation of the grips is 5 mm/min upon reaching the pre-load and 5 mm/min to measure 1% Secant modulus (up to 1% strain). 1% Secant modulus is calculated by drawing a tangent through two well defined points on the stress-strain curve. The reported value corresponds to the stress at 1% strain (with x correction). The result is expressed as load per unit area (N/mm$^2$). The value is an indication of the film stiffness in tension. The 1% Secant Modulus is used for thin film and sheets as no clear proportionality of stress to strain exists in the initial part of the curve.

Elmendorf tear strength was measured in both MD and TD based on ASTM D1922-06a using the Tear Tester 83-11-01 from TMI Group of Companies and measures the energy required to continue a pre-cut tear in the test sample, presented as tearing force in gram. Samples were cut across the web using the constant radius tear die and were free of any visible defects (e.g., die lines, gels, etc.).

TABLE 1

Structure-wise formulations (wt %) for all film samples

| Sample No. | Outer | Inner | Core |
|---|---|---|---|
| 1 | EXCEED ™ 1018KB (95) EXXONMOBIL ™ LDPE LD 150BW (5) | EP1 (100) | Moplen HP456J (100) |
| 2 | EXCEED ™ 1018KB (95) EXXONMOBIL ™ LDPE LD 150BW (5) | EP2 (100) | Moplen HP456J (100) |
| 3 | EXCEED ™ 1018KB (95) EXXONMOBIL ™ LDPE LD 150BW (5) | EP3 (100) | Moplen HP456J (100) |
| 4 | EXCEED ™ 1018KB (95) EXXONMOBIL ™ LDPE LD 150BW (5) | EP4 (100) | Moplen HP456J (100) |
| 5 | EXCEED ™ 1018KB (95) EXXONMOBIL ™ LDPE LD 150BW (5) | EP5 (100) | Moplen HP456J (100) |
| 6 | EXCEED ™ 1018KB (95) EXXONMOBIL ™ LDPE LD 150BW (5) | EP6 (100) | Moplen HP456J (100) |
| A | EXCEED ™ 1018KB (95) EXXONMOBIL ™ LDPE LD 150BW (5) | EXCEED ™ 1018KB (95) EXXONMOBIL ™ LDPE LD 150BW (5) | EXCEED ™ 1018KB (95) EXXONMOBIL ™ LDPE LD 150BW (5) |
| B | EXCEED ™ 1018KB (95) EXXONMOBIL ™ LDPE LD 150BW (5) | EXCEED ™ 1018HA (100) | Moplen HP456J (100) |
| C | EXCEED ™ 1018KB (95) EXXONMOBIL ™ LDPE LD 150BW (5) | VISTAMAXX ™ 6102FL (sub-skin next to outside bubble skin)/ VISTAMAXX ™ 3020FL (sub-skin next to inside bubble skin) (100) | Moplen HP456J (100) |
| D | EXCEED ™ 1018KB (95) EXXONMOBIL ™ LDPE LD 150BW (5) | VISTAMAXX ™ 3020FL (100) | Moplen HP456J (100) |

TABLE 2

Mechanical properties for all film samples

| Sample No. | 1% Secant Modulus MD (N/mm$^2$) | 1% Secant Modulus TD (N/mm$^2$) | Elmendorf Tear MD (g) | Elmendorf Tear MD (g) |
|---|---|---|---|---|
| 1 | 485 | 451 | 949 | 1473 |
| 2 | 482 | 456 | 990 | 1526 |
| 3 | 478 | 462 | 819 | 1420 |
| 4 | 482 | 468 | 848 | 1372 |
| 5 | 508 | 473 | 1078 | 1628 |
| 6 | 483 | 461 | 1084 | 1496 |
| A | 199 | 196 | 516 | 934 |
| B | 571 | 495 | 477 | 912 |
| C | 495 | 477 | 661 | 753 |
| D | 502 | 509 | 589 | 889 |

It can be observed from the above test results in Table 2 that, whether the elastic ethylene copolymer described herein is present in the inner layers (Samples 1-6) or not (Samples B-D), the film samples (all samples except for Sample A) including the polypropylene homopolymer in the core layer exhibited enhanced stiffness, as demonstrated by a higher 1% Secant Modulus both in MD and TD than that of the sample with a core layer otherwise formulated (Sample A). However, tear resistance remained unchanged without the elastic ethylene copolymer (Samples B-D), unless the film samples were equipped with such elastic ethylene copolymer in the inner layers in addition to the polypropylene homopolymer in the core layer (Samples 1-6). As a result of the combined effect imposed by the polypropylene homopolymer and the elastic ethylene copolymer, the inventive samples outperformed the comparative samples, excelling simultaneously in stiffness and tear resistance, as represented by improvement in both 1% Secant Modulus and Elmendorf tear strength.

Without being bound by theory, it is believed that the inventive structure-wise formulation design described herein can serve as a desired alternative to the current solutions available for film performance optimization over a broad range of end-uses.

All documents described herein are incorporated by reference herein, including any priority documents and/or testing procedures. When numerical lower limits and numerical upper limits are listed herein, ranges from any lower limit to any upper limit are contemplated. As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A multilayer film, comprising:
   (a) two outer layers;
   (b) a core layer between the two outer layers, the core layer comprising about 50 wt % to about 100 wt % of a propylene-based polymer, based on total weight of polymer in the core layer; and
   (c) two inner layers each between the core layer and each outer layer, wherein at least one of the inner layers comprises about 50 wt % to about 100 wt % of an ethylene copolymer, based on total weight of polymer in the inner layer, wherein the ethylene copolymer comprises a low crystalline polymer comprising greater than or equal to about 70 wt % units derived from ethylene, less than or equal to about 30 wt % units derived from propylene, and less than about 5 wt % of units derived from $C_4$-$C_{20}$ α-olefins, based on total weight of the polymer, and having the following properties: (i) crystallinity derived from ethylene; (ii) a heat of fusion of about 20 to about 85 J/g; (iii) a polydispersity index ($M_w/M_n$) of less than about 2.5; (iv) a reactivity ratio of about 0.5 to about 1.5; (v) a proportion of inversely inserted propylene units based on 2, 1 insertion of propylene monomer in all propylene insertions, as measured by $^{13}C$ NMR of less than 0.5 wt %; and (vi) a branching index greater than about 0.5; wherein the low crystalline polymer is prepared in a single reactor;
   wherein the multilayer film has: (i) a 1% Secant Modulus of at least about 20%, 50%, or 100% higher in Machine Direction (MD) and of at least about 20%, 50%, or 100% higher in Transverse Direction (TD); and (ii) an Elmendorf tear strength of at least about 20% higher in MD and of at least about 20% higher in TD, compared to that of a film free of the propylene-based polymer in the core layer and the ethylene copolymer in the inner layer, but is otherwise identical in terms of film structure, layers' compositions, and the film's overall thickness.

2. The multilayer film of claim 1, wherein the core layer consists of about 100 wt % of a propylene-based polymer, based on the total weight of polymer in the core layer.

3. The multilayer film of claim 1, wherein at least one of the two inner layers consists of about 100 wt % of the ethylene copolymer, based on total weight of polymer in the inner layer.

4. The multilayer film of claim 1, wherein the propylene-based polymer comprises one or more of (i) a polypropylene homopolymer; (ii) a copolymer derived from propylene and one or more $C_2$ and/or $C_4$ to $C_{10}$ α-olefin comonomers, wherein the copolymer has at least about 60 wt % propylene-derived units, based on total weight of the copolymer, and (iii) an impact copolymer having between 75 and 95 wt % homopolypropylene and between 5 and 30 wt % of ethylene-propylene rubber, wherein ethylene propylene rubber comprises less than about 50 wt % ethylene, and blends thereof.

5. The multilayer film of claim 1, wherein the propylene-based polymer is a polypropylene homopolymer.

6. The multilayer film of claim 1, wherein the ethylene copolymer further comprises a low crystalline polymer blend composition, comprising: (i) from 65 wt % to 90 wt % based on the total weight of the blend of an ethylene α-olefin elastomer having either no crystallinity or crystallinity derived from ethylene, having 70 wt % or more units derived from ethylene; and (ii) from 10 wt % to 35 wt % based on the total weight of the blend of a propylene polymer having 40 wt % or more units derived from propylene, including isotactically arranged propylene derived sequences; wherein the ethylene α-olefin elastomer and the propylene polymer are prepared in separate reactors arranged in parallel configuration.

7. The multilayer film of claim 1, wherein at least one of the outer layers comprises at least about 80 wt % of a polyethylene derived from ethylene and one or more $C_3$ to $C_{20}$ α-olefin comonomers, based on total weight of polymer in the outer layer, wherein the polyethylene has a density of from about 0.900 to about 0.945 g/cm$^3$, an MI, $I_{2.16}$, of from about 0.1 to about 15 g/10 min, an MWD of from about 1.5 to about 5.5, and an MIR, $I_{21.6}/I_{2.16}$, of from about 10 to about 100.

8. The multilayer film of claim 7, wherein at least one of the outer layers further comprises a low density polyethylene (LDPE).

9. The multilayer film of claim 1, wherein the two outer layers have a total thickness of at most about two thirds of the total thickness of the multilayer film.

10. The multilayer film of claim 1, wherein the two outer layers are identical.

11. The multilayer film of claim 1, wherein the two inner layers have a total thickness of at most about 50% of the total thickness of the multilayer film.

12. The multilayer film of claim 1, wherein the core layer has a total thickness of at most about 75% of the total thickness of the multilayer film.

13. The multilayer film of claim 1, wherein the two inner layers are identical.

14. A multilayer film, comprising:
   (a) two outer layers, each comprising: (i) at least about 80 wt % of a polyethylene derived from ethylene and one or more $C_3$ to $C_{20}$ α-olefin comonomers, based on total weight of polymer in the outer layer, wherein the polyethylene has a density of from about 0.900 to about 0.945 g/cm$^3$, an MI, $I_{2.16}$, of from about 0.1 to about 15 g/10 min, an MWD of from about 1.5 to about 5.5, and an MIR, $I_{21.6}/I_{2.16}$, of from about 10 to about 100; and
(ii) an LDPE;
(b) a core layer between the two outer layers, the core layer comprising about 100 wt % of a polypropylene homopolymer, based on total weight of polymer in the core layer; and
(a) two inner layers each between the core layer and each outer layer, wherein each of the inner layers comprises about 100 wt % of an ethylene copolymer, based on total weight of polymer in the inner layer, wherein the ethylene copolymer is a low crystalline polymer comprising greater than or equal to about 70 wt % units derived from ethylene, less than or equal to about 30 wt % units derived from propylene, and less than about 5 wt % of units derived from $C_4$-$C_{20}$ α-olefins, based on total weight of the polymer, and having the following properties: (i) crystallinity derived from ethylene; (ii) a heat of fusion of about 20 to about 85 J/g; (iii) a polydispersity index ($M_w/M_n$) of less than about 2.5; (iv) a reactivity ratio of about 0.5 to about 1.5; (v) a proportion of inversely inserted propylene units based on 2, 1 insertion of propylene monomer in all propylene insertions, as measured by $^{13}$C NMR of less than 0.5 wt %; and (vi) a branching index greater than about 0.5; wherein the polymer is prepared in a single reactor, wherein the multilayer film has: (i) a 1% Secant Modulus of at least about 20%, 50%, or 100% higher in Machine Direction (MD) and of at least about 20%, 50%, or 100% higher in Transverse Direction (TD); and (ii) an Elmendorf tear strength of at least about 20% higher in MD and of at least about 20% higher in TD, compared to that of a film free of the propylene-based polymer in the core layer and the ethylene copolymer in the inner layer, but is otherwise identical in terms of film structure, layers' compositions, and the film's overall thickness.

15. The multilayer film of claim 14, wherein the thickness ratio between each of the outer layers, each of the inner layers, and the core layer is about 2:1:2.

16. A method for making a multilayer film, comprising the steps of:

(a) preparing two outer layers;
(b) preparing a core layer between the two outer layers, the core layer comprising about 100 wt % of a propylene-based polymer, based on total weight of polymer in the core layer;
(c) preparing two inner layers each between the core layer and each outer layer, wherein at least one of the inner layers comprises about 100 wt % of an ethylene copolymer, based on total weight of polymer in the inner layer, wherein the ethylene copolymer is a low crystalline polymer comprising greater than or equal to about 70 wt % units derived from ethylene, less than or equal to about 30 wt % units derived from propylene, and less than about 5 wt % of units derived from $C_4$-$C_{20}$ α-olefins, based on total weight of the polymer, and having the following properties: (i) crystallinity derived from ethylene; (ii) a heat of fusion of about 20 to about 85 J/g; (iii) a polydispersity index ($M_w/M_n$) of less than about 2.5; (iv) a reactivity ratio of about 0.5 to about 1.5; (v) a proportion of inversely inserted propylene units based on 2, 1 insertion of propylene monomer in all propylene insertions, as measured by $^{13}$C NMR of less than 0.5 wt %; and (vi) a branching index greater than about 0.5; wherein the polymer is prepared in a single reactor; and
(d) forming a film comprising the layers in steps (a) to (c), wherein the multilayer film has: (i) a 1% Secant Modulus of at least about 20%, 50%, or 100% higher in Machine Direction (MD) and of at least about 20%, 50%, or 100% higher in Transverse Direction (TD); and (ii) an Elmendorf tear strength of at least about 20% higher in MD and of at least about 20% higher in TD, compared to that of a film free of the propylene-based polymer in the core layer and the ethylene copolymer in the inner layer, but is otherwise identical in terms of film structure, layers' compositions, and the film's overall thickness.

17. The method of claim 16, wherein the multilayer film in step (d) is formed by blown extrusion, cast extrusion, coextrusion, blow molding, casting, or extrusion blow molding.

* * * * *